INVENTOR.
BORIS BOSKOVICH

United States Patent Office 3,505,641
Patented Apr. 7, 1970

3,505,641
AIRCRAFT CONDITION CONTROL APPARATUS WITH REDUNDANT SENSORS
Boris Boskovich, St. Anthony Village, Minn., assignor to Honeywell Inc., Minneapolis, Minn., a corporation of Delaware
Filed Oct. 20, 1965, Ser. No. 498,750
Int. Cl. H04b 3/46
U.S. Cl. 340—27
15 Claims

ABSTRACT OF THE DISCLOSURE

A specialized technique of comparison monitoring to increase reliability, is based primarily on the fact that the output of one type of sensor can be modified in such a manner that it can be compared to the output of another type of sensor. In the specific example considered, the output of an aircraft attitude sensor is essentially differentiated and compared to the output of an aircraft attitude rate sensor. Actually the attitude signal is high-passed and the rate signal is lagged such that high-passed pitch attitude equals lagged pitch rate.

For a dual-channel system, four separate comparisons are made:

The two rate signals are compared directly.

The two attitude signals are compared directly.

Comparisons are made between the rate signals and the attitude signals as properly phased in that as to each redundant channel, the high-passed attitude signal is compared with the lagged attitude rate signal. This yields four outputs from four comparators in the sense that if one comparator receives as two inputs high-passed attitude and lagged attitude rate from channel 1 and a second comparator receives attitude rate from the sensor in channel 2 and attitude rate from the sensor in channel 1, then if both comparators have an output, it is indicative that the rate signal in channel 1 is erroneous since it is common to both comparison devices.

By using this technique, the equivalent of four-channel redundancy can be achieved from a two-channel system. Similarly, the equivalent of duel-channel redundancy can be achieved from a single-channel system having more than one input.

---

This invention relates to improvements in control apparatus for maintaining a condition and wherein the improvement lies in the area of increasing the reliability of operation of the control apparatus. More particularly, increase in reliability of the control apparatus is provided through the principles of redundancy of elements. In the particular arrangement involved, redundancy has been applied to the sensors which sense the condition being controlled.

While redundancy techniques using identical parallel channels to increase reliability have been used heretofore, in many cases such redundancy techniques use three parallel channels, with the third channel being a monitoring channel, for ascertaining which channel contains a malfunction. Such malfunction may be in the sensor in one of the parallel channels.

It is an object of this invention to provide monitoring of a sensor which provides a control signal using merely the sensors in two rather than three channels and identifying the malfunctioning sensor in one of the two channels.

A further object of this invention is to achieve comparison monitoring of sensors in dual parallel channels of a control apparatus using a technique based primarily on the fact that the output of one type of sensor can be modified in such a manner that it can be compared with the output of another type of sensor.

A further object of this invention is to provide a dual-channel control apparatus wherein a comparison of similar sensors of each of the dual channels may be achieved through modification in the signals of the sensors in the dual channels.

A further object of this invention is to make a comparison of four signals obtained or produced from a similar number of sensing devices and identifying the signal which differs from the majority of the other signal sources.

The above and other objects of the invention may be had upon a consideration of the following description taken in conjunction with the drawings describing a preferred embodiment of the invention. Thus in order that the invention may be more readily understood reference will be made to the accompanying drawings which illustrate by way of an example preferred embodiments thereof.

According to one embodiment of the invention, by means of comparison monitoring one source of signal in a dual channel arrangement having four signal sources may be identified. This comparison involves using a technique which is based primarily on the fact that the output of one type of sensor such as a condition change rate sensor in a dual channel can be modified in such a manner that it can be compared with the output of another type of sensor such as a condition change sensor in the dual channel. In the specific example being considered herein, the output of an attitude sensor on an aircraft is essentially differentiated and compared to the output of an attitude rate sensor of the aircraft. Actually the attitude signal is high-passed and the rate signal is lagged such that:

$$\frac{\theta T s}{1+T s} = \frac{\dot{\theta} T}{1+T s}$$

where $s$ is the LaPlace operator and $t$ is the time constant. For the dual channel system four separate comparisons are made:

The two rate signals are compared directly. The two attitude signals are compared directly. Comparisons are made between the rate signals and the attitude signals, after phasing, in each of the redundant channels.

By using this technique the equivalent of four-channel redundancy can be achieved from a two-channel dual redundant system. Similarly, the equivalent of dual-channel redundancy can be achieved from a single-channel system having more than one sensor input.

Where multiplicated channels are used and each channel provides a signal source which is the same as that in the other channels, comparisons are made for identifying which one of the multiplicated channels contains a malfunctioning sensor.

Figure 1:
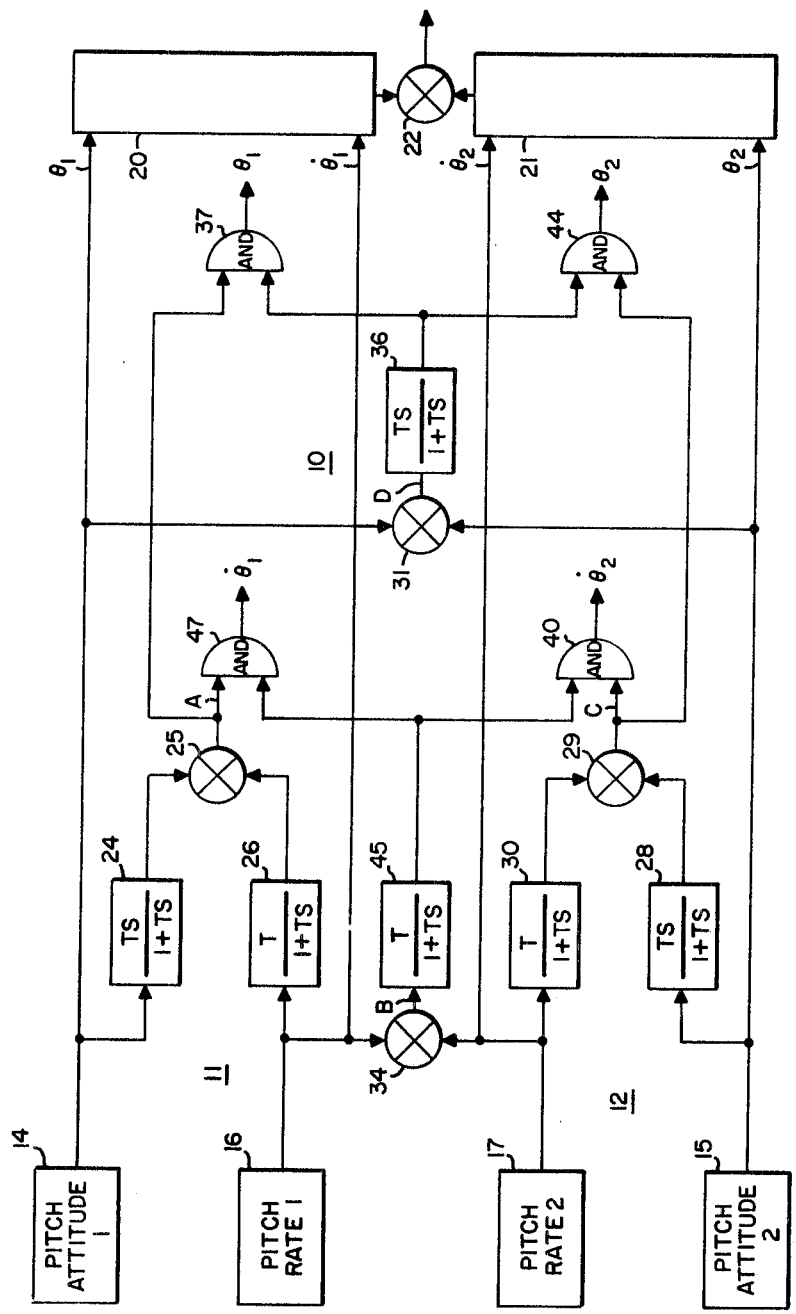
FIGURE 1 is a schematic of a dual channel arrangement for monitoring condition control sensors thereof.

Referring to FIGURE 1, a dual channel system 10 comprises a first channel 11 and a second channel 12. The two channels 11, 12 contain two similar sensors, the similar sensor in one channel sensing the same condition as that in the other channel. Thus channel 11 includes a pitch attitude sensor 14 which corresponds with the pitch attitude sensor 15 of channel 12. Channel 11 also includes a pitch rate or attitude rate sensor 16 corresponding with the pitch rate sensor 17 of channel 12. The signals derived from sensors 14, 16 are supplied directly to an autopilot section 20. Similarly the signals from sensors 15, 17 are applied to an autopilot section 21. The outputs from the two autopilot sections 20, 21 are combined in a summing arrangement 22 which may be used to control the operation of the elevator surface of an aircraft.

For sensor monitoring purposes, the output from sensor 14 is transmitted through a high-pass network 24 to a summing device 25. Similarly the signal from sensor 16 is supplied through a lag device 26 to the summing device 25. Thus the output from summing device 25 equals $\theta_{1H} - \theta_{1L}$, or high passed attitude-lagged attitude rate.

Similarly, the output from sensing device 15 is supplied through a high-pass network 28 to a second summing device 29 which receives as its second input the signal from pitch rate sensor 17 transmitted through a lag network 30. Thus the output from summing device 29 is $\theta_{2H} - \theta_{2L}$, or high passed attitude-lagged attitude rate.

The signals from sensors 14 and 15 are directly supplied to a third summing device 31 so that the output therefrom is $\theta_1 - \theta_2$, or the difference in attitudes sensed.

The outputs from sensors 16 and 17 are directly combined in a fourth summing arrangement 34 so that the output therefrom is $\dot\theta_1 - \dot\theta_2$, or the difference in sensed attitude rates.

Terming the outputs from summing devices 25, 29, 31 and 34 respectively A, C, D and B these outputs are paired and the respective pairs are applied to logic devices 37, 40, 44, 47. Thus the output D from summing device 31 is supplied through a high-pass network 36 to an "AND" logic 37 which receives a second input A from summing device 25. It will be noted with respect to the logic device 37 that of the four control signals supplied thereto namely $(\theta_1-\theta_2)$; $(\theta_{1H}-\theta_{1L})$, $\theta_1$ is used in two instances, but that $\theta_2$ and $\theta_{1L}$ are only used singly. Thus with respect to logic device 37 we are searching for malfunction in the signal $\theta_1$ from sensor 14. In the above $\theta_{1H}$ is $\theta_1$ high-passed; $\theta_{1L}$ is $\theta_1$ lagged. In order that a proper comparison may be made between the $(\theta_1-\theta_2)$ and $(\theta_{1H}-\theta_{1L})$, for proper phasing purposes a high-pass network 36 is supplied so that the quantity $(\theta_1-\theta_2)$ has the same phase as the quantity $(\theta_{1H}-\theta_{1L})$.

A second "AND" logic 44 receives one input D or $(\theta_1-\theta_2)_H$ through high-pass network 36 from summing device 31 and a second input C or $(\theta_{2H}-\theta_{2L})$ from summing device 29, to monitor $\theta_2$.

Similarly, a third "AND" logic device 40 receives through a passive lag network 45 for phasing purposes the output B from summing device 34 and a second input C from summing device 29 to monitor $\dot\theta_2$.

Also a fourth "AND" logic device 47 receives through phasing lag network 45 the output B from summing device 34 and directly receives as a second input the output A from summing device 25, to monitor $\dot\theta_1$.

As stated the output from logic device 37 indicates a failure or malfunction in sensor 14. Similarly the logic devices 40, 44, and 47 determine respectively malfunctions in sensors 17, 15 and 16.

It can now be seen from "AND" logic 47 that if we have an output A from signal summing device or signal comparator 25, which indicates that $\theta_{1H}$ is not approximately equal to $\theta_{1L}$, and concurrently a signal B out of comparator or summing device 34, indicating that $\dot\theta_2$ is not approximately equal to $\dot\theta_1$, then the pitch rate signal in channel 1 ($\dot\theta_1$) is erroneous since it is a common signal to both comparators or summing devices 25, 34.

Similarly, form logic 37, if the output A of summing device 25 is not approximately zero and the output D of summing device 31 is not approximately zero, then $\theta_1$ or sensor 14 has failed or malfunctioned.

From logic 40 if the output B of summing device 34 is not approximately zero and the output of C summing device 29 is not zero, then $\dot\theta_2$ or sensor 17 has failed.

From logic 44, if output C of summing device 29 is not approximately zero and concurrently the output D of summing device 31 is not approximately zero, then $\theta_2$ or sensor 15 has failed.

Thus by using this technique of comparing derived signals, as stated, the equivalent of four-channel redundancy can be achieved from a two-channel system and we can identify which of 4 signal sources has failed or is malfunctioning.

The outputs from the "AND" logic devices 37, 40, 44 and 47 may be used to isolate the malfunctioning sensor by disconnecting it from the control apparatus, alternatively if desired an indication may be provided by the outputs of the logic devices.

Figure 2:
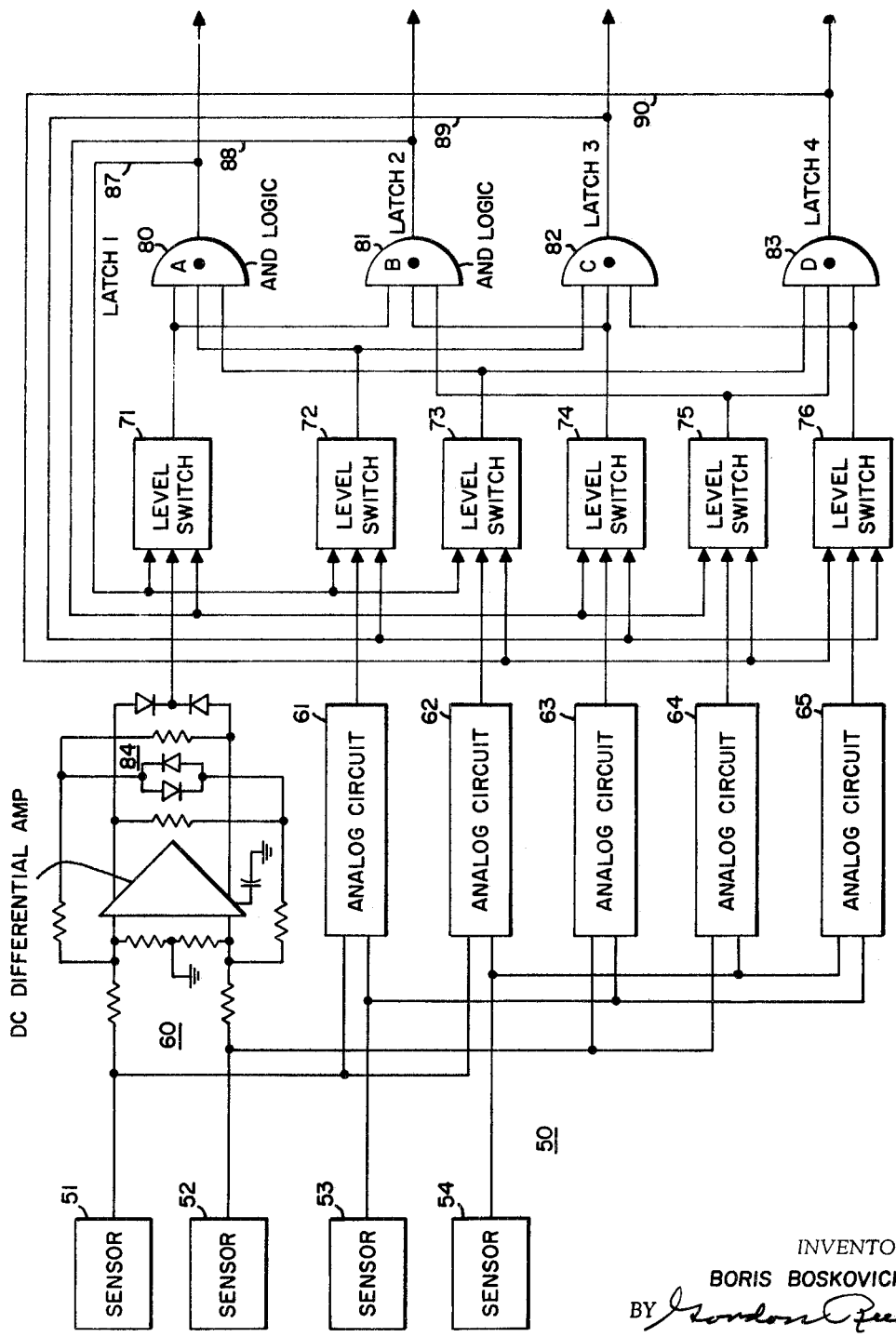
FIGURE 2 is a schematic of multiplicated channels with comparison and monitoring means of similar sensor in each of the channels.

In FIGURE 2 there is a monitoring arrangement 50 for also selecting one of 4 signal sources that is malfunctioning. In FIGURE 2 the monitoring arrangement 50 is associated with 4 signal sources 51, 52, 53 and 54.

The signal sources 51, 52, 53 and 54 all sense the same condition such as pitch attitude, pitch rate of an aircraft or a similar condition in a condition control apparatus. In the present instance the sensors provide variable magnitude DC signals having a magnitude dependent upon the condition being sensed, such as magnitude of pitch rate or magnitude of attitude departure from level flight. The monitoring arrangement includes a six DC differential amplifiers 60, 61, 62, 63, 64 and 65 only one of which is shown schematically.

Included in the monitoring arrangement are level switches 71, 72, 73, 74, 75 and 76.

Four "AND" logic devices 80, 81, 82 and 83 are also included in monitoring arrangement 50. The number of the "AND" devices corresponds with the number of signal sources.

Associated with each of the DC differential amplifiers, in an absolute value circuit corresponding with absolute value circuit 84 comprising a pair of diodes associated with DC differential amplifier 60. The absolute value circuit 84 serves to transmit the greater of two positive voltages from the output of the differential amplifier associated therewith to its corresponding level switch. The outputs from the absolute value devices as applied to its respective level switch in turn is supplied to one of the "AND" logic devices. The output from the logic devices may control an indicator or may be used to disengage the malfunctioning sensor or signal source of control apparatus such as an automatic pilot for an aircraft. The output from each "AND" logic device is fed back through a latch circuit to the input of related level switches. Thus the feedback circuit 87 of "AND" device 80 has a locking effect on its level switches and is applied to level switches 71, 72, and 73. In a similar manner the latching circuit for the remaining "AND" devices 81, 82, and 83 are supplied to their related level switches. The connections from the feedback circuits are identified with respect to the related level switches.

DC control signals from conditions sensors 51, 52, 53 and 54 are supplied in pairs to the DC differential amplifiers 60, 61, 62, 63, 64 and 65. For example sensors or signal devices 51 and 52 are connected to differential amplifier 60, signal devices 51 and 53 are connected to amplifier 61, signal sources 51 and 54 are connected to amplifier 62; signal sources 52 and 53 are connected to amplifier 63; signal devices 52 and 54 are connected to amplifier 64 and signal devices 53 and 54 are connected to amplifier 65.

For ease of manipulation the signals from sources 51, 52, 53 and 54 are identified respectively as A, B, C and D. The output of level switch 71 as controlled by amplifier 60 is $A-B$, the output of level switch 72 is $A-C$, the output of level switch 73 is $A-D$. Thus the "AND" logic device 80 which receives these three level switch outputs is searching or minitoring for failure in the A signal or failure of signal source 51.

Similarly the inputs to logic device 81 are $A-B$, $B-C$, $B-D$ so that device 81 is searching for or monitoring the malfunction in sensor signal B or failure of sensor 52.

Likewise logic device 82 receives from level switches, signals $A-C$, $D-C$ and $C-D$ so that it is searching for failure in sensor signal C or failure of sensor 53.

Also logic device 83 receives from corresponding level switches signals $A-D$, $B-D$ and $C-D$ so that it is searching for malfunction in sensor signal D or failure of sensor 54.

Thus with respect to "AND" logic 80 if $A-B$ is not equal to zero, and $A-C$ is not equal to zero, and $A-D$ is not equal to zero there will be an output from "AND" logic device 80 and a latching input signal will be supplied to level switches 71, 72 and 73. Importantly the output of logic 80 as stated may also be used to indicate a malfunction in sensor signal A or sensor 51, and it may be rendered ineffective to control the automatic condition control apparatus. In a similar manner for the logics 81, 82, 83 failure of B, C, D can be determined.

What is claimed is:

1. In a dual channel control system, a pair of first type condition signal producers, one signal producer in each of the dual channels; a pair of second type condition signal producers, one in each dual channel, the second type condition signal producers each providing a signal that is a derivative of the signal from the first type condition signal producers;
   four signal comparison or summing means;
   a high pass network and a lag network between one of the first pair of signal producers and one of the second pair of signal producers respectively, and a comparison means for two of the comparison means;
   a connection from each of the second signal producers to a third comparison or summing means and a connection from each of the first signal producers to a fourth comparison or summing means.

2. The structure of claim 1, and a malfunction detecting means receiving an output from one of said two comparison means, and means including a phasing network, connecting said malfunction detecting means and the third comparing means, for detecting malfunction in one of said second condition signal producers.

3. The structure of claim 1, and a malfunction detecting means receiving an output from one of said two comparison means, means including a phasing network connecting the fourth comparison means to the malfunction detecting means, for detecting malfunction in one of the first type condition signal producers.

4. In a dual channel condition control system, a pair of first condition sensors, one in each channel;
   a pair of second condition sensors, one in each channel, the second condition sensors each providing a type of signal that is a derivative of the type of signal from the first condition sensor; and
   signal transmitting phase network means comprising high pass networks and lag networks responsive to the signals from said four sensors, signal comparison means connected to the network means providing four outputs corresponding to $\theta_{1H}-\theta_{1L}$, $\theta_1-\theta_2$, $\theta_{2H}-\theta_{2L}$, $\theta_1-\theta_2$, wherein the subscripts 1 and 2 indicate the first and second of the dual channels and $\theta_{1H}$ indicates that the signal from the first condition sensor is high passed and $\theta_{1L}$ indicates that the signal from the second condition sensor in the first channel is lagged, and an "AND" logic device responsive to the first and fourth outputs for ascertaining malfunction in sensor $\theta_1$.

5. In a condition control system, a first condition sensor providing a first signal in accordance with the first condition;
   a pair of second condition sensors each providing a second signal in accordance with a second condition, the second sensors providing a type of signal that is a derivative of the type of signal from the first condition sensor;
   a high pass signal transmission network connected to the first sensor and providing a first output;
   a lag signal transmission network connected to one of the second sensors and providing a second output, a first signal comparison means combining said two outputs to determine a difference in said two outputs;
   a second signal comparison means connected to both of said second condition sensors;
   a malfunction detector;
   a phasing network connecting said second comparison means and malfunction detector; and
   means connecting the first comparison means and malfunction detector to detect error in one of the second signals.

6. In a dual channel condition control system having a pair of first condition sensors, one in each channel;
   a pair of second condition sensors, one in each channel, the second condition sensor each providing a type of signal that is a derivative of the type of signal from the first condition sensors;
   monitoring means for said condition sensors said monitoring means comprising signal transmission network means responsive to signals from said four sensors and including lag networks and high pass networks and providing four outputs corresponding to $\theta_{1H}-\theta_{1L}$, $\theta_1-\theta_2$, $\theta_{2H}-\theta_{2L}$, $\theta_1-\theta_2$, where the subscripts H and L indicate high pass or lag effects respectively, subscrips 1 and 2 indicate the first and second channels, and $\theta$, $\theta$ indicate respectively the first condition sensor signal and the second condition sensor signal, and an "AND" logic device responsive to two of said outputs wherein one output varies with the difference between the signals from the second pair of sensors and the other output varies with the difference between a signal from one of the first pair of sensors high-passed and a signal from one of the second pair of sensors lagged said logic device serving to detect error in the signal from one of the second condition sensors.

7. In a monitoring arrangement for identifying a malfunction in any of four signal supplying means or signal sources, comprising:
   means separately supplying four signals;
   means providing four distinct comparisons of the two signals of four different selected pairs of said four signals including means utilizing one common signal in at least two of said pairs of signals being compared, and a plurality of logic devices, each logic device receiving as inputs the results of the comparison of two pair of signals of which each of the two pair include said one signal and providing an output on the presence of two inputs, and means energized by said output of each logic device, to determine error in said one common signal.

8. The apparatus of claim 7, wherein the four signals are provided by four sensing devices sensing a similar condition.

9. The apparatus of claim 7 wherein the comparison means comprise a DC differential amplifier and an absolute value device and providing a positive output from the absolute device in accordance with the difference between two input signals supplied to said amplifier.

10. The apparatus of claim 9 wherein the output from the absolute value device operates a level switch having a limited value threshold for operation.

11. The apparatus of claim 10 and an "AND" circuit receiving as input the outputs from three level switches wherein the outputs of such three level switches is dependent upon a common signal from one sensing device whereby any output of the "AND" circuit indicates malfunction in the source developing the common signal.

12. In a condition control apparatus, a monitoring arrangement for identifying a malfunction in any of four signal sources which may be used to control the apparatus, comprising:
   means supplying four separate control signals;

means comparing the relative magnitude of paired signals from a plurality of selected but different pairs of signals taken from said four signals wherein one signal is common in at least two of said pairs; and a plurality of AND logic devices, each device receiving plural inputs from the comparing means of which two inputs include said one signal and providing an output, and means energized by the output of each logic device to determine error in said common signal.

13. The apparatus of claim 11 wherein the comparison means includes means for comparing two of said signals directly, means for comparing two others of said four signals directly and means including phasing networks comparing one of said first pair of signals and one of said second pair of signals.

14. The apparatus of claim 12 wherein the four signal sources comprise two pairs of signals, a first pair of signals being in accordance with aircraft attitude and the second pair of signals being in accordance with aircraft attitude rate about an axis.

15. The apparatus of claim 4, a third sensor having means for providing a third signal also in accordance with changes in the first condition;

means for placing said four signals from the four sensors in pairs, means comparing the relative magnitudes of two pairs of paired signals one signal being common to said two pairs of signals; and logic means responsive to a comparing means of two pairs of signals for detecting error in the signal common to said two pairs.

References Cited

UNITED STATES PATENTS 3,077,557   2/1963   Joline et al. _____ 340—27 XR

ALVIN H. WARING, Primary Examiner

U.S. Cl. X.R.

244—77; 333—2; 340—292